1. REACTION IN $N_2$-ATMOSPHERE
2. NEUTRAL FLUE GAS- RESIDENCE TIME 40 MIN.
3. NEUTRAL FLUE GAS- RESIDENCE TIME 20 MIN.

Kurt Meyer
Wilhelm Thumm
Inventors.

By Karl F. Ross
Attorney

United States Patent Office 3,682,620
Patented Aug. 8, 1972

---

3,682,620
PROCESS FOR THE MANUFACTURE OF PELLETS OF HIGH COMPRESSIVE STRENGTH AND ABRASION RESISTANCE
Kurt Meyer and Wilhelm Thumm, Frankfurt, Germany, assignors to Metallgesellschaft Aktiengesellschaft, Frankfurt, Germany
Filed Feb. 18, 1970, Ser. No. 12,276
Claims priority, application Germany, Feb. 22, 1969,
P 19 09 037.0
Int. Cl. C21b 1/08
U.S. Cl. 75—3  11 Claims

ABSTRACT OF THE DISCLOSURE

A process for manufacturing strong pellets, i.e. pellets of high compressive strength, abrasion resistance and low expansion, for use in ore-reduction furnaces, wherein finely divided sponge iron ($100\% < 300\mu$) is mixed with the iron-oxide ore or ore concentrate. The resulting pellets are fired in an atmosphere selected in accordance with the amount of elemental iron combined with the iron-oxide to yield a pelletized product having an average iron: oxygen mole ratio between 1:1 and 1:1.33.

---

FIELD OF THE INVENTION

Our present invention relates to a process for the manufacture of pellets and, more particularly, to a process for producing pellets of iron-ore or iron-ore concentrates suitable for use in reduction plants, e.g. blast furnaces, cupola-type shaft furnaces and the like, in which reduction of the iron oxide is performed with the aid of solid reducing materials (e.g. coke) and/or reducing gases passed through the mass of pellets at reducing temperatures.

BACKGROUND OF THE INVENTION

In the last 20 years, various attempts have been made to increase the output of blast furnaces and other iron-producing reducing plants using iron-oxide and iron-oxide-ore concentrates. In one such improvement, the iron-ore or ore concentrate is ground, milled or otherwise comminuted and the particles agglomerated into pellets having a diameter of, say, 10 to 18 mm. The pelletizing process may make use of a rotating drum, disk or tray and is generally accompanied by an additional of moisture so that the fine particles form into balls. The moist product, frequently referred to as "green pellets" is dried and then fired.

The use of such pellets have been accompanied by various difficulties which have been attacked with vigor by investigators in the industry. For example, it is recognized that the pellets should have high compressive strength to resist the mechanical stresses of pellet handling and manipulation, but that efforts to increase compressive strength frequently yield a decease in porosity. The porosity of the pellets is essential for uniform reduction of the iron-oxide and high furnace efficiency. Another factor which enters into consideration in the use of pellets in shaft-type or cupola or blast furnaces, is the abrasion resistance of the pellets which have heretofore tended to break down and produce a mass of fine particles during the primary metallurgical process or in the handling of the pellets, thereby blocking the interstitial passages through the pellets. It has also been found that the expansion characteristics of the pellets are critical to effective operation of a metallurgical process of the type described. Excessive expansion under heat or otherwise during the metallurgical process results in spalling with the inconveniences mentioned above with respect to abrasion and to the filling of inter-pellet interstices as a result of swelling.

Various efforts have been made to eliminate these difficulties and the use of binders, special firing techniques, preheating and comminuting systems, etc. have been proposed, some with limited success and others unsuccessfully. In addition to the difficulties encountered is efforts to eliminate the problems arising from the use of pellets, some processes have been discarded commercially in that they unreasonably elevate the cost of operating the pelletizing and processing systems.

OBJECTS OF THE INVENTION

It is, therefore, the principal object of the present invention to provide an improved process for the formation of pellets containing iron-oxides and suitable for use in a blast furnace or other ore-reduction plant wherein the aforedescribed disadvantages of earlier pellets are avoided.

Another object of this invention is to provide an improved method of making iron-oxide pellets of high compressive strength, high abrasion resistance, low expandibility and high sustained porosity.

SUMMARY OF THE INVENTION

These objects and others which will become apparent hereinafter are attained, in accordance with the present invention, with a process for making iron-oxide pellets, especially for use in blast furnaces and ore-reduction plants, whereby finely divided metallic iron is combined with iron-oxide substances and the resulting mixture pelletized. Subsequent to pelletization, the product is fired at a temperature of 900° to 1200° C. in a controlled atmosphere, the nature of atmosphere, any cooling environment and/or the relative amounts of metallic iron and iron-oxide combined in the pellets being selected to maintain an average molar atomic ratio of iron to oxygen (Fe:O) in the final product of 1:1.0 to 1:1.33.

Our investigations have demonstrated that compressive strength and hardness of the pellets alone are not the most significant of the properties of a pellet which can be controlled or optimized by maintaining the mole ratio of iron to oxygen (Fe:O) as indicated. Most surprising, the present invention not only provides pellets which are "strong," i.e. have a high compressive strength and resistance to abrasion, but also pellets which have physical properties under conditions of use in the metallurgical process which may be even more critical and significant. We refer here to the expansion characteristics of the pellets and the formation of fines, i.e. particles of small particle size, as a result of expansion, spalling or ablation. In fact, the pellets constituting the products of the present invention have surprisingly reduced expansion and little tendency to form finely divided materials which may obstruct gas flow through the furnace.

As noted earlier, the iron:oxygen mole ratio, on an average, should be between 1:1 and 1:1.33, this ratio being in part determined by the activity of the gases used in the firing process and in part by the relationships established when the metallic iron is combined with the iron oxide. For example, in the use of a neutral gas (i.e. an inert gas or a gas in which the reducing components and oxidizing components are in practical stoichiometric balance so that the gas has neither a reducing or oxidizing effect), the mole ratio may be determined solely by the ratio at which the elemental iron is combined with the iron-oxide ore or ore concentrate. Should the iron-oxide content be excessive, upon mixing in the manner discussed above, it is preferred to use a firing atmosphere having somewhat reducing characteristics. Conversely, an excess of oxygen after a pelletizing stage may call for a slight oxidizing atmosphere. The definition of the average mole ratio Fe:O of 1:1.0 to 1:1.33 signifies that the average total oxygen, in all of the various iron-oxide phases and metallic iron should be such that the pellet can be considered to homogeneously be represented by a formula from FeO to $FeO_{1.33}$. This is not to say that the pellets are indeed homogeneous in this sense and, on this point, applicants wish to point out that, while they cannot fully explain the phenomena, the indicated mole ratio is critical.

Furthermore, reference has been made above to the activity of the atmosphere. It is to be noted that, for the purposes of the present invention, only the activity of the atmosphere under the operating condition of the present process is of interest. For example, both water vapor and carbon dioxide have been considered to be oxidizing components of gas mixtures in some metallurgical processes, but are substantially inert or neutral when gas mixtures containing same are employed as the firing atmosphere in the treatment of the pellets. Hence only the activity of the atmosphere under the operating condition of the present invention and upon the metallic iron and the iron ore being processed is significant. The activity of the atmosphere with respect to different operating conditions and other reactants is not material. Also the composition of the gas atmosphere depends, to a degree, on the duration of the heat treatment, the amount of metallic iron which is supplied, and the nature or form of the metallic iron. With a relatively short heat treatment and/or a higher metallic-iron content, the oxygen partial pressure in the atmosphere may be higher than that used with a longer heat treatment or a smaller quantity of metallic iron. What is critical, however, is to maintain the atmosphere and proportion of metallic iron such that the composition of the pellets is within the critical ratio.

According to the present invention, the firing atmosphere may range from the slightly reducing to the slightly oxidizing and may be neutral or substantially neutral as indicated earlier. Preferably, the atmosphere consists of 100 to 0% by volume nitrogen, 0 to 30% by volume water vapor, 0 to 70% by volume carbon dioxide, 0 to 2% oxygen, 0 to 10% by volume carbon monoxide, 0 to 4% by volume hydrogen and 0 to 1% by volume hydrocarbons of the general formula $C_nH_m$, where $n$ and $m$ are integers, and $m$ is equal to $n$, $2n$ or $2n+2$.

Where slightly oxidizing gases are used, they should not contain free oxygen in excess of 2.0% by volume unless it is compensated by reducing components. Such gas atmosphere may have, e.g., the following composition in percent by volume:

| | |
|---|---|
| $O_2$ | 0.5–2.0 |
| $H_2O$ | 5–10 |
| $CO_2$ | 12–22 |
| CO | 0.3–1.0 |
| $N_2$ balance. | |

Technically usable atmospheres having a neutral activity may consist of nitrogen or a mixture of $CO_2$—$H_2O$ or $N_2$—$CO_2$—$H_2O$. An atmosphere having a neutral activity may contain oxidizing and reducing components, provided that the activities of such components compensate each other under the conditions under which the pellets are fired.

The composition of the slightly reducing atmosphere is approximately defined by the following ranges in percent by volume:

| | |
|---|---|
| CO | 3–10 |
| $H_2$ | 1–4 |
| $C_nH_m$ | 0.2–1 |
| $CO_2$ | 10–18 |
| $H_2O$ | 7–14 |
| $O_2$ | 0–1 |
| $N_2$, balance. | |

For economy, it is recommended to keep the addition of fine-grained metallic iron below about 30%. In that case it may be necessary to fire the pellets in an atmosphere free from oxygen to ensure that the required iron-oxygen ratio is obtained.

The fine-grained metallic iron which is employed consists preferably of sponge iron, which may be obtained as abraded fines in a direct-reduction process and/or by grinding sponge-iron pellets. Iron filings or other iron waste obtained in machining processes may also be employed, provided that these materials are as fine as is required. The fineness will be sufficient if 100% are below 300 microns and 70% are below 100 microns.

The pellets are preferably dried before they are fired. Drying may be carried out in the firing unit.

To improve the strength of the green pellets and of the dry pellets, binders such as bentonite may be added to the material to be pelletized. Metallurgically active substances, such as lime, may be admixed to slag the gangue.

The process according to the invention may be used with magnetitic and hematitic ores. In the processing of hematitic ores, it is generally desirable to add more fine-grained metallic iron than with magnetitic ores.

The green pellets are fired in equipment which is conventional for this purpose, such as rotary kilns, rotary hearth furnaces, shaft furnaces, pellet-firing machines having straight or annular grates etc. Rotary kilns, rotary hearth furnaces and shaft furnaces are particularly suitable. In equipment having grates, it is preferred to protect the grates in the usual manner by a grate cover and protective side covers.

The time required to heat the charge is generally 10–90 minutes. Suitable residence times are in the range of 5–40 minutes.

The first pellets may be cooled directly or indirectly. This cooling should be controlled so that the average Fe:O mole ratio in the fired pellet is maintained as far as possible and remains, in any case, in the range of 1:1.0 to 1:1.33. Inert cooling gases or cooling water applied in an inert atmosphere are preferred coolants. When cooling directly with water, care should be taken to supply water at such a rate that the fired pellets have a temperature of about 200° C. when cooled. This ensures that the pellets will not absorb moisture, which would adversely affect their strength.

DESCRIPTION OF THE DRAWING

The above and other objects, features and advantages of the present invention will become more readily apparent from the following description, reference being made to the accompanying drawing in which.

SPECIFIC DESCRIPTION

Figure 4:
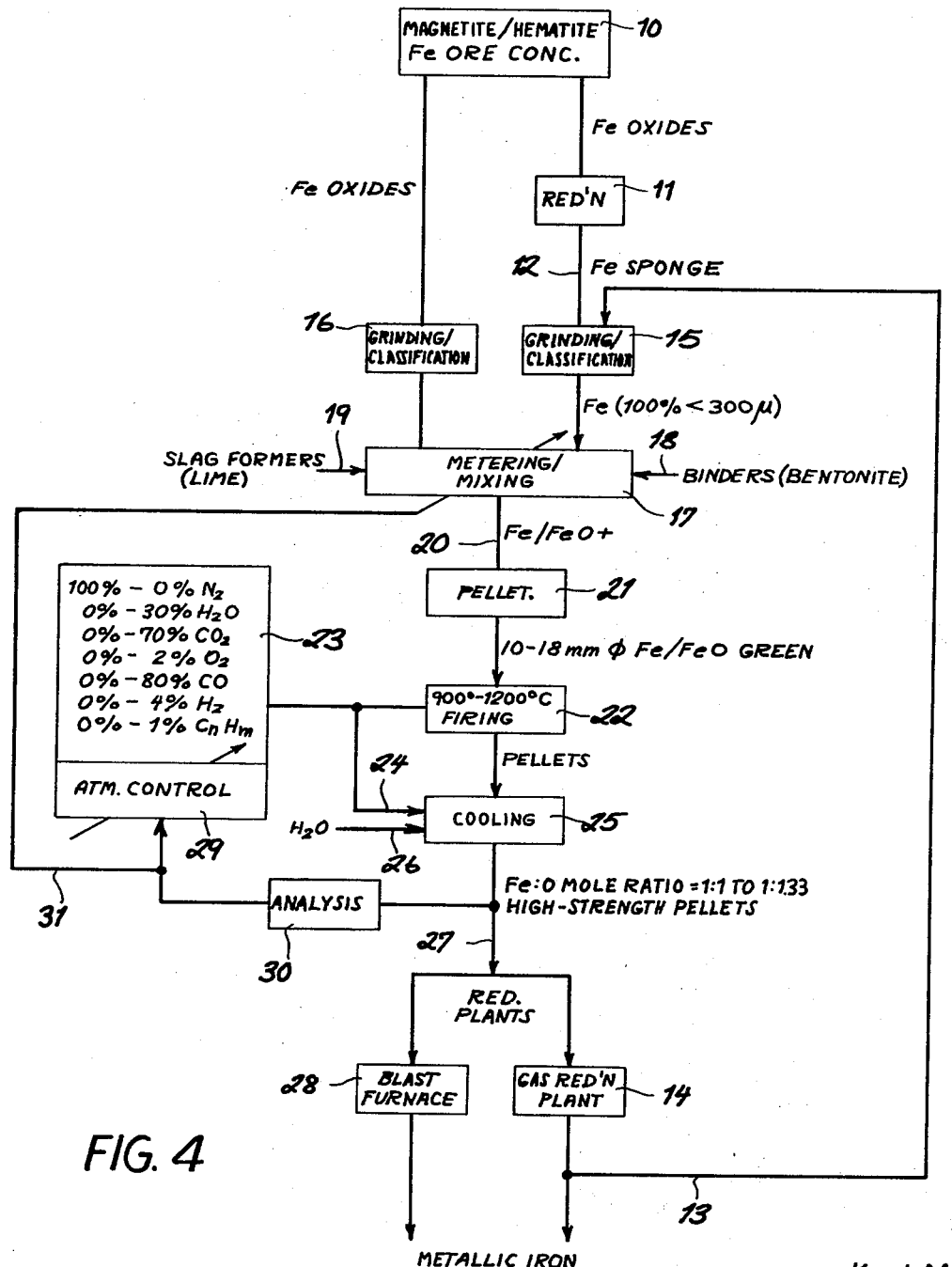
FIG. 4 is a flow diagram illustrating the invention.

Referring first to FIG. 4, it can be seen that the raw materials of the present process are magnetite and hematite iron ore or ore concentrates which are recovered at 10. The particle size ranges up to 10 mm. The iron ore or ore concentrates represented as Fe oxides, may be partly reduced at 11 by direct gas reduction to produce iron sponge at 12. Alternatively, the iron sponge may be withdrawn at 13 from a gas reduction plant 14 in which the pellets are employed. In either case, the iron sponge is ground and milled and classified at 15 to provide particles having a maximum particle size of 300 microns, 70% having a particle size below 100 microns.

The principal components of the pellets of the present invention are iron oxides which are ground and classified at 16 to a particle size, say below 0.15 mm. and preferably with 80% below 0.044 mm.

The two components (generally 1 to 30% metallic Fe and 99 to 70% iron oxides) are mixed at 17 and any binders, e.g. bentonite in an amount up to 2% by weight can be added at 18 while slag formers such as lime are added in an amount up to 5% by weight at 19. The resulting mixture, preferably having an iron/oxygen molar ratio within the aforementioned critical range, is delivered at 20 to the pelletization stage from which pellets emerge in the form of balls of a diameter of 10 to 18 mm. These pellets from the pelletizing stage 21 are led to a firing stage 22, in the form of a kiln or oven of any of the conventional type mentioned earlier. A controlled-atmosphere source 23 supplies gas to the kiln 22 and, as represented at 24, to the subsequent cooling stage 25. Water may be used to cool the pellets as shown at 26 when the pellets have a temperature in excess of 200° C. at the time they are contacted with the water. The resultant high compressive strength, low expansion pellets are recovered at 27 and supplied at 28 to the blast furnace or at 14 to a gas reduction plant. The composition of the atmosphere is controlled at 29 in accordance with the pellet analysis obtained at 30, the result being used to regulate the metering and mixing stage 17 to ensure proper proportioning of the metallic iron and the iron oxide as represented by the line 21.

Figure 1:
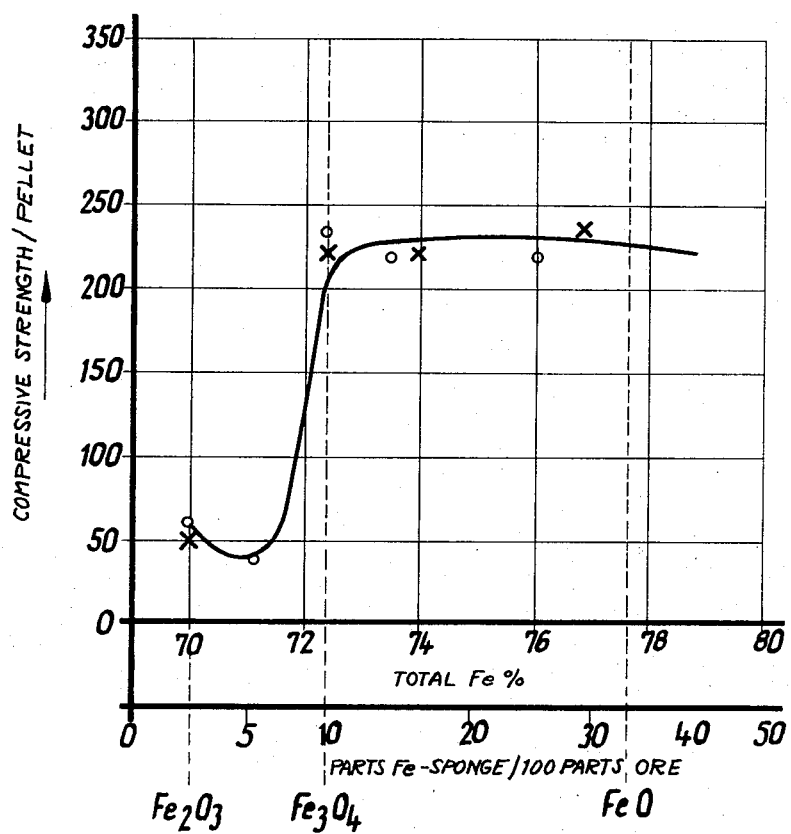
FIG. 1 is a graph illustrating the compressive strength as a function of the sponge-iron content.

FIG. 1 shows the compressive strength of pellets which have been made from hematitic ore and increasing admixtures of sponge iron in a nitrogen atmosphere at temperatures of 1100° C.

It is apparent from the graph that apart from a minor initial reduction, the compressive strength increases as the admixture of sponge iron is increased. The compressive strength reaches a maximum in the range of an average Fe:O mole ratio of 1:1.33 to 1:1.0 and then remains virtually constant.

Figure 2:
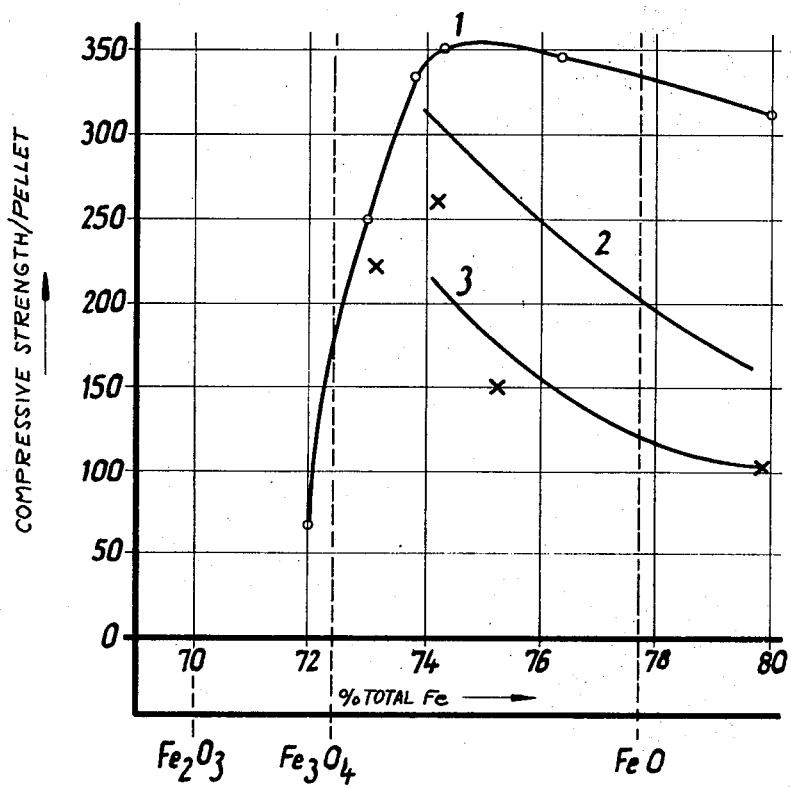
FIG. 2 is a graph of the compressive strength, illustrating the relationship of the compressive strength to the firing-gas composition.

A fairly similar course is exhibited in FIG. 2 by the compressive strength of pellets made from magnetitic ores and sponge iron and fired at 1100° C. in an atmosphere of nitrogen or neutral flue gas. In this case, maximum strengths were obtained with a total iron content in the range of 74–75%, when about 10% sponge iron had been admixed.

Figure 3:
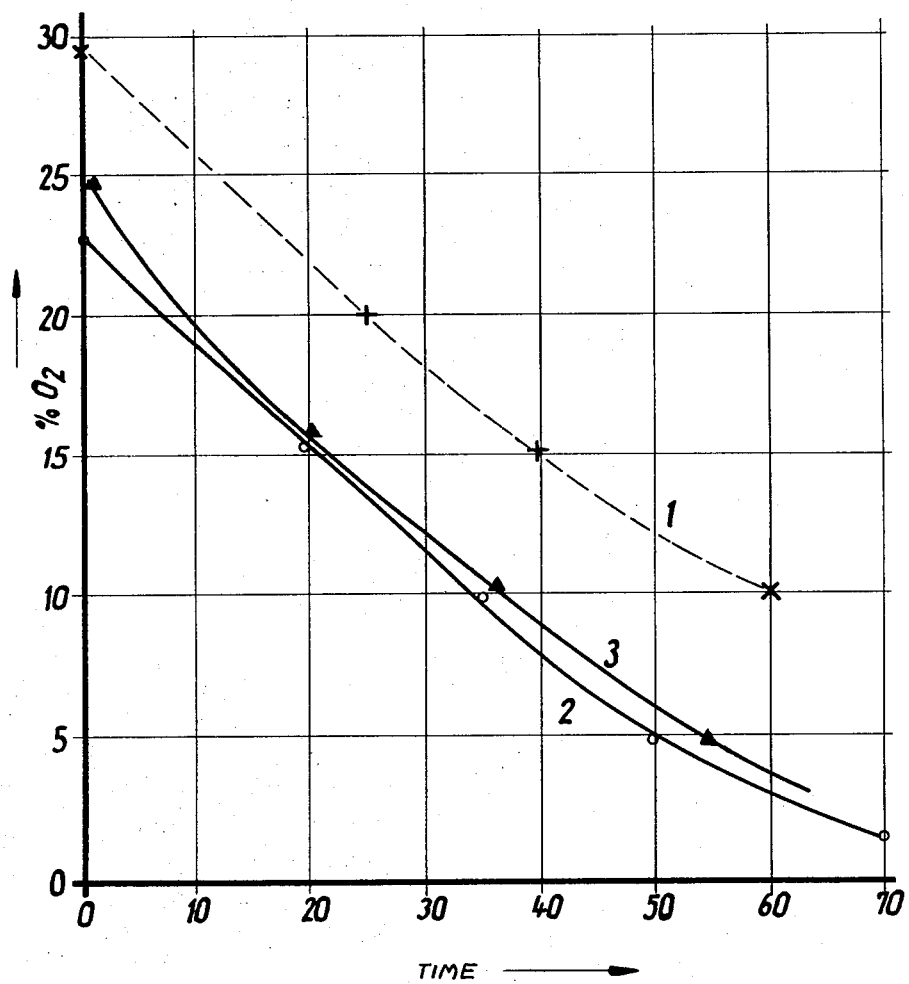
FIG. 3 is a graph of the reducing characteristics of the pellets according to the present invention.

FIG. 3 illustrates the reduction behavior of pellets made in accordance with the invention when these are reduced at a temperature of 1000° C. and with a reducing gas consisting of 80% CO and 20% $N_2$. The oxygen content in percent is plotted along the ordinate and the reducing time in minutes along the abscissa. The reduction which is expressed in the several experiments by the removal of $O_2$ exhibits a qualitatively similar course for all kinds of pellets which were investigated. With hematitic pellets made without an admixture of sponge iron and fired in air (curve 1), the oxygen content was removed to about 10% after a reducing time of 60 minutes. In the fired pellets, according to the invention, which were made from magnetite and an admixture of 25% sponge iron, the oxygen was removed to about 3–4% within the same time. Curve 2 was obtained when the pellets were fired in a nitrogen atmosphere and curve 3 when they were fired in an atmosphere consisting of flue gas and small amounts of CO. A removal of oxygen down to about 10% is obtained after a reducing time of about 35 minutes.

SPECIFIC EXAMPLES

The examples which explain the process according to the invention are compiled in the following table.

Table 1 describes the results which were obtained by the firing of hematitic and magnetitic ores to which fine-grained metallic iron in the form of sponge iron had been admixed. In all experiments, the pellets were fired at a temperature of 1100° C. in a nitrogen atmosphere. The amount of sponge iron admixed to 100 parts of ore is stated in column 2, the firing time in column 3 and the iron ore which was used in column 4. Column 5 states the average compressive strength in kilograms per pellet. Column 6 states the distribution of divalent and trivalent iron and of any surplus metallic iron in the fired pellets.

TABLE 1

| 1 | 2 | 3 | 4 | 5 | 6 | | |
|---|---|---|---|---|---|---|---|
| | Admixture of sponge iron | Firing time, min. | Kind of ore | Compressive strength, kg./pellet | Analysis of fired pellets | | |
| Example Number | | | | | $Fe_{met}$ | $Fe^{..}$ | $Fe^{...}$ |
| 1 | | 20 | Hematite | 54 | | 2.6 | 67.1 |
| 2 | | 40 | do | 61 | | 2.8 | 67.2 |
| 3 | 5 | 40 | do | 43 | | 15.8 | 55.3 |
| 4 | 10 | 20 | do | 223 | | 26.2 | 45.2 |
| 5 | 20 | 20 | do | 219 | 1.0 | 43.3 | 29.6 |
| 6 | | 40 | Magnetite | 71 | | 23.9 | 48.1 |
| 7 | 10 | 15 | do | 223 | | 44.9 | 29.1 |
| 8* | 10 | 15 | do | 263 | | 44.8 | 28.5 |
| 9 | 10 | 40 | do | 345 | | 43.3 | 31.0 |
| 10* | 20 | 15 | do | 187 | 3.9 | 61.8 | 11.2 |
| 11 | 20 | 40 | do | 344 | 3.3 | 60.5 | 12.6 |
| 12 | 25 | 15 | do | 180 | 3.6 | 62.8 | 10.6 |
| 13 | 25 | 40 | do | 194 | 2.0 | 70.0 | 5.4 |
| 14 | 25 | 40 | do | 182 | 2.9 | 65.0 | 9.2 |

*Admixture of 0.5% bentonite.

The pellets made in Examples 1, 2 and 6 (without an admixture of sponge iron) have a low strength. The same remark is applicable to the pellets of Example 3, which contain 5% sponge iron but lack the essential feature of the invention that the Fe:O mole ratio lies in the range of 1:1.33 to 1:1.

The pellets of Examples 4, 5 and 7–14 exhibit this feature and are distinguished by a high compressive strength.

Table 2 reports experiments carried out with different flue gas atmospheres.

The "flue gas $+O_2$" mentioned in column 7 contains 4% by volume free oxygen and the "flue gas$+$CO" contains 5% by volume CO.

The firing temperature is also 1100° C. The values stated in columns 1 to 6 have the meanings stated in connection with Table 1.

TABLE 2

| Number | Admixture of sponge iron | Firing time, min. | Kind of ore | Compressive strength, kg/pellet | Analysis of fired pellets | | | Firing atmosphere |
|---|---|---|---|---|---|---|---|---|
| | | | | | $Fe_{met}$ | $Fe\cdot\cdot$ | $Fe\cdot\cdot\cdot$ | |
| 1 | | 40 | Hematite | 58 | | 1.0 | 67.9 | Flue gas plus $O_2$ |
| 2 | 12.5 | 20 | do | 42 | | 17.2 | 52.7 | Do |
| 3 | 20 | 20 | do | 108 | | 18.7 | 52.4 | Do |
| 4 | 40 | 20 | do | 222 | 1.4 | 26.6 | 43.3 | Do |
| 5 | 12.5 | 20 | do | 184 | | 36.2 | 35.7 | Flue gas plus CO |
| 6 | 25 | 20 | do | 226 | | 45.5 | 28.4 | Do |
| 7 | 10 | 20 | Magnetite | 226 | | 45.0 | 28.2 | Flue gas |
| 8 | 10 | 20 | do | 260 | 1.3 | 50.5 | 22.4 | Do |
| 9 | 25 | 20 | do | 150 | 0.7 | 53.0 | 21.5 | Do |
| 10 | 40 | 40 | do | 319 | | 57.7 | 22.1 | Do |
| 11 | 25 | 40 | do | 186 | 1.4 | 59.2 | 20.1 | Flue gas plus CO |
| 12 | | 40 | do | 50 | | 14.2 | 57.1 | Flue gas plus $O_2$ |
| 13 | 10 | 40 | do | 81 | | 20.0 | 46.2 | Do |
| 14 | 20 | 40 | do | 256 | | 46.0 | 28.6 | Do |
| 15 | 25 | 20 | do | 295 | 2.2 | 63.5 | 9.7 | Do |
| 16 | 40 | 20 | do | 395 | 1.6 | 56.7 | 17.3 | Do |
| 17 | 40 | 40 | do | 154 | 6.7 | 50.0 | 19.3 | Do |

The pellets made in Examples 1 and 12 and containing no sponge iron had low compressive strengths of 58 and 50 kilograms per pellet, respectively. Similar remarks are applicable to Examples 2, 3 and 13, in which sponge iron was added to 100 parts of ore in amounts of 12.5, 20, and 10 parts, respectively, but in which the pellets were fired in an atmosphere which contained oxygen in such an amount that the effect desired according to the invention from the metallic iron was eliminated. The analysis of fired pellets in column 6 indicates that the average Fe:O mole ratio in the range of 1:(1.33 to 1) was not reached.

The pellets of Examples 4 to 11 and 14 to 17 had a sufficiently high compressive strength. In Examples 4 and 14 to 17, which were also made in an oxygen-containing firing atmosphere, it is remarkable that a high admixture of sponge iron (40 parts) eliminates the adverse effect of the oxygen contained in the atmosphere in which the pellets are fired.

Note that, in these examples, the minimum compressive strength per pellet was about 150 kg.

Table 3 reports the expansion behavior (increase in volume) and the change in strength of hematitic and magnetitic pellets as determined by the Gakushin reduction test. In this test, 500 grams of fired and sized pellets are heated in a vertical furnace in a neutral atmosphere to the reducing temperature and then subjected to a reducing gas stream.

The gas pressure is recorded (Part "A") which is obtained in the system when the gas flows at a predetermined rate of 15 liters per minute. A change of the interstitial volume in the pellet layer will change also the gas pressure so that the latter indicates the expansion of the pellets. The Examples 1–4 reported in the subsequent table (Part "B") were carried out at a reduction temperature of 1000° C. and with a reducing gas consisting of 80% CO and 20% $N_2$. The corresponding conditions in Examples 5–7 were a reduction temperature of 900° C. and contents of 30% CO and 70% $N_2$ in the reducing gas.

The table states in column 1 the consecutive numbers of the experiments, in column 2 the amount of sponge iron admixed per 100 parts of ore, on column 3 the kind of ore and in column 4 the distribution of divalent, trivalent and any metallic iron. Column 5 states the average compressive strength in kilograms (a) for the fired pellets and (b) for the reduced pellets. Columns 6 and 7 state the expansion index or the increase in volume. Column 8 states the atmosphere in which the pellets are fired during the preliminary treatment. In this case, too, the "flue gas+$O_2$" contained 4% by volume of free oxygen and the "flue gas+CO" contained 5% by volume CO.

TABLE 3

[Part A]

| No. | Admixture of sponge iron | Kind of ore | Analysis | | | Compressive strength, kilograms per pellet | |
|---|---|---|---|---|---|---|---|
| | | | $Fe_{met}$ | $Fe\cdot\cdot$ | $Fe\cdot\cdot\cdot$ | (a) | (b) |
| 1 | | Magnetite | | 0.4 | 68.5 | 300 | 30 |
| 2 | 25 | do | 2.9 | 65.2 | 9.2 | 182 | 293 |
| 3 | 25 | do | 1.4 | 54.2 | 20.1 | 186 | 304 |
| 4 | 40 | do | | 55.7 | 19.8 | 240 | 220 |
| 5 | 10 | do | | 44.9 | 29.1 | 223 | 250 |
| 6 | 12.5 | Hematite | | 49.0 | 24.2 | 229 | 163 |
| 7 | 40 | do | 1.4 | 26.6 | 43.3 | 222 | 90 |

[Part B]

| No. | Expansion, percent | Increase in volume, percent | Preliminary treatment: firing atmosphere |
|---|---|---|---|
| 1 | 11.3 | 43.0 | Flue gas plus air. |
| 2 | 1.2 | 3.3 | $N_2$. |
| 3 | −5.5 | −19.0 | Flue gas plus CO. |
| 4 | −0.8 | −0.3 | Flue gas plus $O_2$. |
| 5 | −1.8 | −5 | $N_2$. |
| 6 | −0.3 | −1 | Flue gas plus CO. |
| 7 | 2 | 6 | Flue gas plus $O_2$. |

The pellets made according to the invention (Examples 2–7) exhibit a good to excellent behavior in the subsequent reducing stage. A decrease in volume can be observed in most cases (Examples 3 to 6). Whereas pellets having a high compressive strength are made in Experiment 1, the increase in volume in the reducing stage amounts to 43%, which is too high. In Experiments 4 and 7 in which the pellets were fired in an atmosphere which contained $O_2$, good results were obtained by a large admixture of sponge iron (40%).

We claim:

1. A process for producing pellets of high compressive strength, low swellability and little spalling for use in a reduction furnace, comprising the steps of:
   (a) mixing fine-grain sponge metallic-iron particles and iron-oxide-containing substances and thereafter pelletizing the resulting mixture;
   (b) subsequently firing the pellets produced in step (a) at a temperature between 900° and 1200° C. in a controlled atmosphere; and
   (c) regulating the proportion of metallic iron to iron-oxide substances in step (a) and the atmosphere in step (b) to yield pellets subsequent to step (b) having a iron:oxygen molar ratio of substantially 1:1 to 1:1.33 with a compressive strength per pellet of at least about 150 kg.

2. The process defined in claim 1 wherein said atmosphere has an activity with respect to iron and iron oxide between a slight reducing activity and a slight oxidizing activity and consists essentially of 100 to 0% by volume nitrogen and a finite amount of at least one of the following components:

0 to 30% by volume water, 0 to 70% by volume carbon dioxide, 0 to 2% by volume oxygen, 0 to 10% by volume carbon monoxide, 0 to 4% by volume hydrogen and 0 to 1% by volume hydrocarbons of the formula $C_nH_m$ wherein $n$ and $m$ are integers and $m$ can be equal to $n$, $2n$ and $2n+2$.

3. The process defined in claim 2 wherein the firing temperature in step (b) ranges between 1050° and 1200° C.

4. The process defined in claim 3 wherein said sponge iron is combined with the iron-oxide substances in an amount of up to 30 parts of metallic iron per 100 parts of iron-oxide substances.

5. The process defined in claim 4 wherein said sponge iron has a particle size below about 300 microns.

6. The process defined in claim 5, further comprising the step of adding a binder to the mixture in step (a) prior to the formation of the pellets therefrom.

7. The method defined in claim 5, further comprising the step of adding a slag-forming substance to the mixture in step (a) prior to the formation of the pellets therefrom.

8. The process defined in claim 5, further comprising the step of drying said pellets prior to the firing thereof in step (b).

9. The process defined in claim 1 wherein said pellets are fired in step (b) by initially heating the pellets to the firing temperature within a period of 10 to 90 minutes and thereafter holding the pellets at said firing temperature for a period of 5 to 40 minutes.

10. The process defined in claim 1, further comprising the step of cooling the pellets fired in step (b) while maintaining the iron:oxygen molar ratio thereof, upon firing, substantially constant.

11. The process defined in claim 1 wherein said substances are magnetite or hematite iron ore or iron-ore concentrates, said sponge iron has a particle size below 300 microns, said metallic iron being combined with the iron-oxide ore or ore concentrate in an amount not exceeding 30 parts by weight of metallic iron per 100 parts by weight of the iron ore or ore concentrate, said temperature ranges bewteen 1050° and 1200° C. and said pellets in step (b) are heated to said temperature in a period of 10 to 90 minutes and are held at said temperature for a period of 5 to 40 minutes, said atmosphere consisting essentially of 100 to 0% by volume nitrogen, and a finite amount of at least one of the following components:

0 to 30% by volume water, 0 to 70% by volume carbon dioxide, 0 to 2% by volume oxygen, 0 to 10% by volume carbon monoxide, 0 to 4% by volume hydrogen and 0 to 1% by volume hydrocarbons of the formula $C_nH_m$ wherein $n$ and $m$ are integers and $m$ can be equal to $n$, $2n$ and $2n+2$.

References Cited

UNITED STATES PATENTS

| | | | |
|---|---|---|---|
| 2,864,686 | 12/1958 | Agarwal | 75—3 |
| 3,273,993 | 9/1966 | Melcher | 75—1 |
| 3,428,445 | 2/1969 | Rausch et al. | 75—3 |
| 3,497,348 | 2/1970 | Rausch et al. | 75—33 |
| 3,228,763 | 1/1966 | Herkenhoff et al. | 75—5 |
| 3,304,168 | 2/1967 | Ban | 75—3 |
| 3,105,757 | 10/1963 | Peras | 23—200 X |
| 3,148,972 | 9/1964 | Peras | 75—34 X |
| 3,305,312 | 2/1967 | Weinstein et al. | 75—34 X |

ALLEN B. CURTIS, Primary Examiner

U.S. Cl. X.R.

75—34